United States Patent
Bao et al.

(10) Patent No.: US 10,054,339 B2
(45) Date of Patent: Aug. 21, 2018

(54) ENERGY STORAGE DEVICE

(71) Applicant: UNIVERSITY OF NEWCASTLE UPON TYNE, Tyne and Wear (GB)

(72) Inventors: Huashan Bao, Tyne and Wear (GB); Anthony Paul Roskilly, Tyne and Wear (GB)

(73) Assignee: UNIVERSITY OF NEWCASTLE UPON TYNE, Tyne and Wear, OT (GB)

( * ) Notice: Subject to any disclaimer, the term of this patent is extended or adjusted under 35 U.S.C. 154(b) by 0 days.

(21) Appl. No.: 15/116,438

(22) PCT Filed: Feb. 6, 2015

(86) PCT No.: PCT/GB2015/050325
§ 371 (c)(1),
(2) Date: Aug. 3, 2016

(87) PCT Pub. No.: WO2015/118337
PCT Pub. Date: Aug. 13, 2015

(65) Prior Publication Data
US 2017/0010028 A1   Jan. 12, 2017

(30) Foreign Application Priority Data
Feb. 6, 2014   (GB) .................................. 1402059.8

(51) Int. Cl.
| | |
|---|---|
| F25B 17/00 | (2006.01) |
| F25B 17/08 | (2006.01) |
| F25B 25/02 | (2006.01) |
| F25B 27/00 | (2006.01) |
| F25B 11/02 | (2006.01) |

(52) U.S. Cl.
CPC ............ *F25B 17/083* (2013.01); *F25B 25/02* (2013.01); *F25B 27/007* (2013.01); *F25B 11/02* (2013.01); *F25B 2400/14* (2013.01); *Y02A 30/278* (2018.01); *Y02B 30/64* (2013.01)

(58) Field of Classification Search
CPC .......... F25B 17/08; F25B 11/02; F25B 17/00; F25B 17/083; Y02B 30/62
USPC .................................................... 62/106, 477
See application file for complete search history.

(56) References Cited

FOREIGN PATENT DOCUMENTS

WO   2010/138677   12/2010

OTHER PUBLICATIONS

International Search Report for PCT/GB2015/050325 dated Apr. 30, 2015.
International Written Opinion for PCT/GB2015/050325 dated Apr. 30, 2015.
Bao et al., "Modelling of a chemisorption refrigeration and power cogeneration system," Applied Energy, vol. 119, 2014, pp. 351-362.

*Primary Examiner* — Melvin Jones
(74) *Attorney, Agent, or Firm* — Norton Rose Fulbright US LLP

(57) ABSTRACT

This invention relates to a chemisorption based energy storage device, able to provide electricity, heating or cooling depending on the desired energy output. The device typically comprises sorbent materials which have an affinity for a refrigerant gas at different temperatures.

15 Claims, 1 Drawing Sheet

TR-CAES system schematic, (1) first step of compression; (2a) second step of expansion for power generation; (2b) second step of producing heat; (2c) second step of producing cooling.

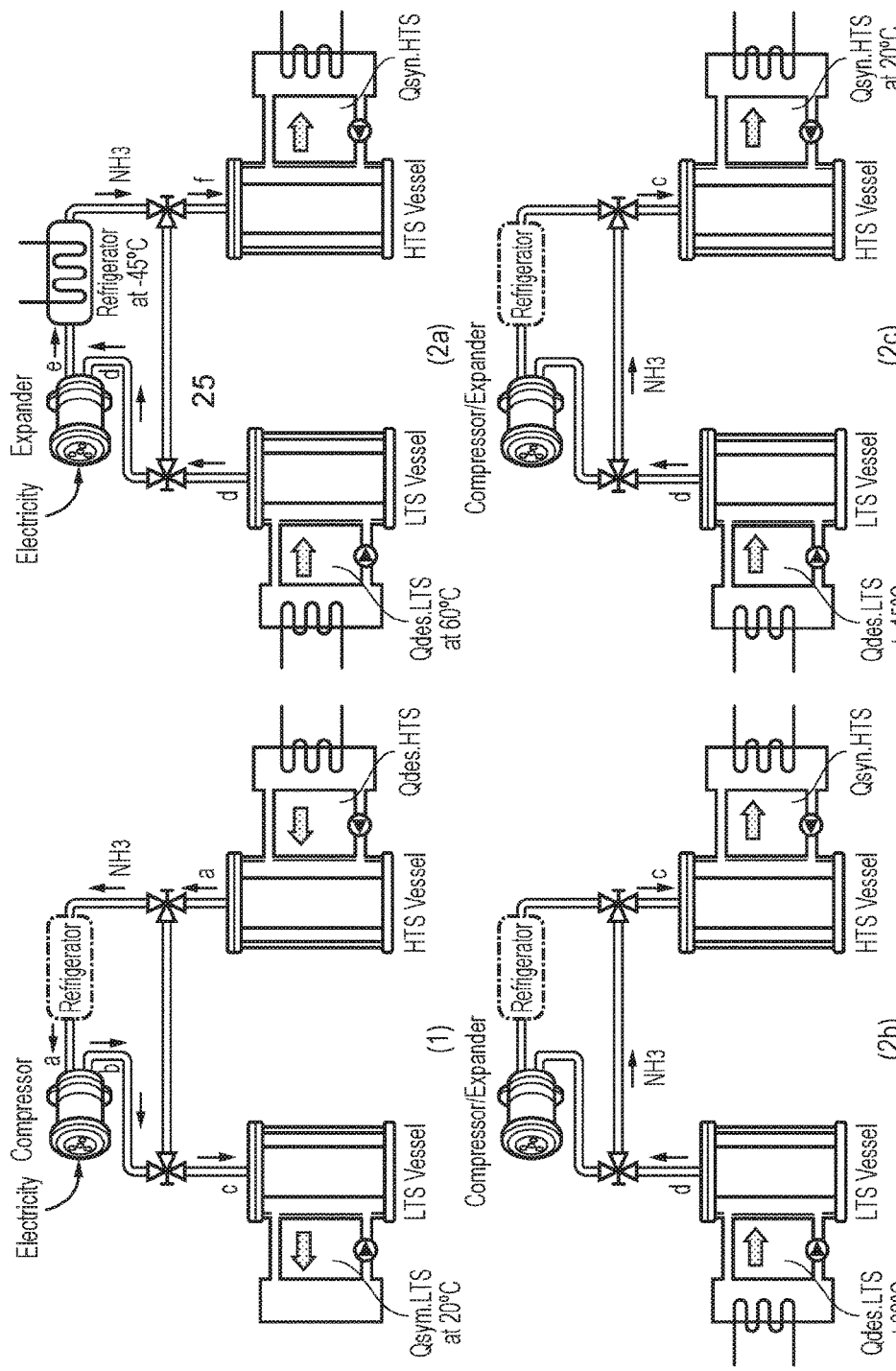

ENERGY STORAGE DEVICE

This application is a national phase application under 35 U.S.C. § 371 of International Application No. PCT/GB2015/050325 filed Feb. 6, 2015, which claims the benefit of priority to GB 1402059.8 filed Feb. 6, 2014. The entire contents of each of the above-referenced disclosures is specifically incorporated by reference herein without disclaimer.

There is disclosed an energy storage device. In particular, there is disclosed a chemisorption based energy storage system, able to provide electricity, heating or cooling depending on the desired energy output.

BACKGROUND

The development of energy storage is necessary in order to reduce our dependency on fossil fuels and to improve our ability to store energy produced by energy sources where the energy output is controlled by weather rather than energy needs. Energy sources such as wind and wave may produce an excess of energy when the demand for energy is low, such as during the night, and the ability to efficiently store the excess energy until the demand increases is required.

There are several types of energy storage currently used, the type used depends upon the quantities of energy storage required as some energy storage types become astronomically expensive or unachievably large. Conventional compressed air energy storage (CAES) is useful for large scale energy storage such as grid scale, from around ten to 300 megawatts. In principle, a CAES system in combination with a wind farm connected to the grid for example, is able to store energy underground by compressing air and storing the compressed air in the impermeable cave when the energy produced by the wind farm is not required by the demands on the gird. When energy demands increase, the compressed air in the cave is released and is used to produce electricity. Because conventional CAES systems require specific geological condition, the location of CAES sites is limited.

WO2010138677 discloses an adsorption enhanced compressed air energy system whereby the storage vessels are provided with porous materials such as carbon, silica gel or zeolites. The compressed gases are more easily stored in the presence of the porous material because the absorbed phase is much denser than the free gas, thus reducing the volume of the storage tank required.

BRIEF SUMMARY OF THE DISCLOSURE

In accordance with a first aspect there is provided a chemisorption based energy storage device comprising:

a first chemical reactor containing a first sorbent material and a second chemical reactor containing a second sorbent material, the first sorbent material having an affinity towards a refrigerant gas at a first temperature and the second sorbent material having an affinity towards the refrigerant gas at a second temperature, the first and second chemical reactors being further provided with means for putting heat in to, or taking heat out of, the first and/or the second sorbent materials;

a compressor/expander module selectively connected to the first and second chemical reactors, the compressor/expander module being configured to either compress or expand the refrigerant;

wherein the means for putting heat in to, or taking heat out of, the first and/or the second sorbent materials provides a flow of refrigerant between the compressor/expander module and the first and second chemical reactors, and wherein the compressor/expander module is operable to compress or expand the refrigerant depending on energy storage requirements.

A benefit of the chemisorption based energy storage device is that it provides thermal and electric energy storage, and it is capable of efficiently recovering stored energy to deliver electricity, heating or cooling depending on different user requirements.

The flexibility of the energy storage device and its capability of recovering stored energy is comparable to flow batteries because the system operates at an improved efficiency compared with existing energy storage systems.

A pressure difference between the first and second chemical reactor drives the cycle. The first chemical reactor containing a first sorbent material has a reaction pressure at a specific temperature. The second chemical reactor containing a second sorbent material has a reaction pressure at a specific temperature. If the difference between first reactor pressure and the second reactor pressure is sufficient, the pressure difference drives the cycle. Furthermore, the pressure difference between an inlet and an outlet of the compressor/expander module drives refrigerant for power output.

A further benefit of the chemisorption based energy storage device is that it can be housed in low-pressure tanks and therefore does not need to be housed underground like existing compressed air energy storage systems. As such, geographical location is not limited to areas of deep rock as for compressed air energy storage systems, or located in elevated positions near large bodies of water as for pumped hydro storage systems. The chemisorption based energy storage device may be stored at ground level.

Additionally, the chemisorption based energy storage device has a higher storage density than other energy storage systems and therefore the overall size of the device may be reduced while maintaining the same energy storage capacity and outputs. This is due to the higher sorption capacity of the first and second chemical reactors.

The chemisorption based energy storage device is cost-effective because of the size reduction of the system and because of the simple and compact construction of the chemisorption based energy storage device which also results in a reduced manufacturing time and simpler maintenance. The modular nature of the device allows components to be maintained and replaced as necessary.

The first temperature and the second temperature may be the same. This configuration is acceptable when the system is configured to output electricity. Typically, however, the first temperature will be a high temperature and the second temperature will be a low temperature. This configuration is particularly preferred when the system is configured to output heat or cooling and is also acceptable when the system is configures to output electricity.

Optionally, the refrigerant may be ammonia.
Optionally, the refrigerant may be methanol.
Optionally, the refrigerant may be steam.

Environmental-friendly refrigerants such as ammonia, methanol and steam have zero ozone depletion potential (ODP) and zero global warming potential (GWP). Furthermore, ammonia has the desirable characteristics of superior thermodynamic qualities. Moreover from an economic perspective, ammonia refrigeration is the most cost effective and energy efficient method of processing and storing frozen and unfrozen foods.

The first sorbent material and the second sorbent material may be the same (e.g. the same metal salt). This configuration is acceptable when the system is configured to output electricity. Typically, however, the first temperature sorbent material and the second sorbent material will be different (e.g. will be different metal salts). This configuration is particularly preferred when the system is configured to output heat or cooling and is also acceptable when the system is configured to output electricity.

Optionally, the first sorbent material may be a salt, e.g. a metal salt. The salt may be selected from salts which are able to form dative bonds with refrigerant gasses, e.g. ammonia. The salt may be a metal halide, e.g. a metal chloride. Metal halide salts are well suited to systems in which the refrigerant is ammonia, methanol or steam. The salt may be a metal sulphide. Metal sulphide salts are well suited to systems in which the refrigerant is ammonia or methanol. The salt may be a metal sulphate. Metal sulphate salts are well suited to systems in which the refrigerant is steam. The salt may be selected from the group: $NiCl_2$, $CaCl_2$, $MgCl_2$, $MgSO_4$ and $MnCl_2$ Optionally, the second sorbent material may be a salt, e.g. a metal salt. The salt may be selected from salts which are able to form dative bonds with refrigerant gasses, e.g. ammonia. The salt may be a metal halide, e.g. a metal chloride or a metal bromide. Metal halide salts are well suited to systems in which the refrigerant is ammonia, methanol or steam. The salt may be a metal sulphide. Metal sulphide salts are well suited to systems in which the refrigerant is ammonia or methanol. The salt may be a metal sulphate. Metal sulphate salts are well suited to systems in which the refrigerant is steam. The salt may be $CaCl_2$, $SrCl_2$, $BaCl_2$ and NaBr.

Provided they have the appropriate interactions with the refrigerant, the first and second sorbent materials could be the same type (e.g. both are metal halides), or a mix of salts (e.g. one metal halide, one metal sulphide), as long as their thermodynamic equilibrium of reaction match with each other. Thus, a further benefit of the device is that there are numerous working pairs capable of refrigeration and heat pumping at different temperature levels and therefore a single system may include working pairs operating at different temperatures further expanding the usability of device.

By using two salts, a single heat source temperature is able to drive the device and produce a higher coefficient of performance (COP) because the desorption heat of second sorbent material in the second chemical reactor is higher than the vaporization enthalpy of the refrigerant gas. In addition, the chemisorption based energy storage device can be installed in any position or location, because there is no liquid inside the reactors and it does not rely on ambient conditions or gravitational field strength. The device may be integrated with turbomachinery because the device is capable of delivering higher power outputs due to larger pressure differences between the first and second chemical reactors.

Under the same heat source temperature, the device may produce higher coefficient of performance (COP) than that of conventional solid sorption systems, because the desorption heat of the sorbent inside the second chemical reactor is higher than the vaporization enthalpy of the refrigerant. In addition, the device can be installed in any position, or in ambient conditions with no gravity because there is no liquid inside the first and second chemical reactors. For the integration with turbomachinery, the device potentially produces more power than conventional adsorption cycle due to the bigger pressure difference between the chemical reactors.

Optionally, the first sorbent material and/or the second sorbent material may be porous. A porous sorbent material has a larger surface area per unit of volume than a non-porous material. Thus, a greater amount of refrigerant gas can be adsorbed onto the sorbent material, providing the system with a greater capacity relative to its size.

Optionally, a valve may be provided to provide selective connection to the compressor/expander module. In some examples, selective valves may be incorporated into the device to selectively connect components. For example, one compressor and one expander could be arranged on different loops with selective valves, a device combining the compressor and expander could be one of the options, as it operates compression with feed-fluid flowing in one direction and operates expansion while the flowing direction reverses. Integrating a compressor via a selective valve on a loop creates the possibility of recovering ultra-low grade heat via the chemisorption cycle disclosed herein.

In accordance with a further aspect there is provided a method of operating a chemisorption based energy storage device to store energy, the device comprising a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
  heating the first chemical reactor to release refrigerant gas from the first sorbent material;
  compressing the refrigerant gas released from the first chemical reactor; and
  entraining compressed refrigerant gas to the second chemical reactor, the compressed refrigerant gas adsorbing onto the second sorbent material.

It might be said that heating the first chemical reactor initiates a chemical reaction. Thus, heating the reactor causes the refrigerant gas to desorb from the sorbent material. Typically this will involve the breaking of chemical bonds (e.g. dative bonds) between the refrigerant gas and the sorbent.

If the refrigerant gas is at low pressure, the refrigerant gas is compressed and subsequently adsorbed by the second chemical reactor.

In accordance with a further aspect there is provided a method of operating a chemisorption based energy storage device to store energy, the device comprising a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
heating the first chemical reactor to release refrigerant gas from the first sorbent material;
expanding the refrigerant gas released from the first chemical reactor; and
entraining refrigerant gas to the second chemical reactor, the refrigerant gas adsorbing onto the second sorbent material.

If the refrigerant gas is under high enough pressure, the refrigerant gas is expanded through the compressor/expander module for electricity output.

In accordance with a further aspect there is provided a method of operating a chemisorption based energy storage device to store energy and generate electric power and refrigeration,
the device comprising a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant,
the method comprising:
heating the second chemical reactor to release a high pressure refrigerant gas;
entraining the high pressure refrigerant gas to the compressor/expander module;
expanding the high pressure refrigerant gas to produce electricity and an exhausted refrigerant gas; and
entraining the exhausted refrigerant gas to the first chemical reactor for adsorption onto the first sorbent material.

In accordance with a further aspect there is provided a method of operating a chemisorption based energy storage device to store energy and generate heat,
the device comprising a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant,
the method comprising:
heating the second chemical reactor to release a high pressure refrigerant gas; and
entraining the high pressure refrigerant gas directly to the first chemical reactor causing the high pressure refrigerant gas to adsorb onto the first sorbent material to provide heat.

It might be said that entraining the refrigerant gas onto the first sorbent material triggers a chemical reaction. Thus, the entraining causes the refrigerant gas to adsorb onto the sorbent material. Typically this will involve the forming of chemical bonds (e.g. dative bonds) between the refrigerant gas and the sorbent material which leads to the release of heat. The heat generated could be described as a high temperature synthesis heat.

In accordance with a further aspect there is provided a method of operating a chemisorption based energy storage device to store energy and generate refrigeration,
the device comprising a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant,
the method comprising:
extracting heat from an external source and directing that heat to the second chemical reactor causing release of refrigerant gas from the second sorbent material; and
entraining the refrigerant gas directly to the first chemical reactor wherein the refrigerant gas is adsorbed onto the first sorbent material.

It might be said that heating the second chemical reactor initiates a chemical reaction. Thus, heating the reactor causes the refrigerant gas to desorb from the sorbent material. Typically this will involve the breaking of chemical bonds (e.g. dative bonds) between the refrigerant gas and the sorbent.

The devices operated in the second mentioned aspect and subsequently mentioned aspects may be devices according to the first mentioned aspect. Thus, the optional features described in relation to the first mentioned aspect apply equally to the second mentioned aspect and subsequently mentioned aspects.

BRIEF DESCRIPTION OF THE DRAWINGS

Embodiments of the invention are further described hereinafter with reference to the accompanying drawings, in which:
FIG. 1 is a schematic of the system. Inset 1 shows the first step of compression; inset 2a shows the second step of expansion for power generation; inset 2b shows the second step of producing heat; and inset 2c shows the second step of producing cooling.

DETAILED DESCRIPTION

First sorbent material may be in the form of a high temperature salt adsorbent bed in a vessel. Examples of appropriate adsorbent salts (particularly effective when the refrigerant is ammonia) are $NiCl_2$, $CaCl_2$, $MgCl_2$, $MgSO_4$ and $MnCl_2$.

The second sorbent material may be in the form of a low temperature salt adsorbent bed in a vessel. Examples of appropriate adsorbent (particularly effective when the refrigerant is ammonia) salt are $CaCl_2$, $SrCl_2$, $BaCl_2$ and NaBr.

Chemisorption is a form of adsorption which involves the formation of and breaking of chemical bonds (e.g. dative bonds) between an adsorbate (in this case the refrigerant gas) and a sorbent.

The chemisorption storage system is capable of reproducing electricity or heating or cooling depending on different energy requirements. It promises greater flexibility comparable to flow batteries.

Where a sorbent has an affinity for a refrigerant gas at a given temperature, the equilibrium between the gas being adsorbed (i.e. chemically bonded to the sorbent) and the gas not being adsorbed (i.e. not chemically bonded to the sorbent) at that temperature lies towards the gas being adsorbed.

The terms 'high temperature' and 'low temperature' used in this specification are intended to be understood relative to each other.

A single cycle of the energy storage device is composed of four main components: high temperature salt vessel (HTS adsorbent bed), low temperature salt vessel (LTS adsorbent bed), a compressor which can work in reverse as an expander, and a heat exchanger for releasing cold energy. The working principle of one complete cycle is made up of two steps. A compressor or expander may be located on separate loops as two separate components.

In the first step, the energy storage system uses the off-peak period electricity to drive the compressor which pressurizes the ammonia released from HTS ammoniates, a-b shown in FIG. 1(1) represents the isentropic compression. The ammonia is stored in the form of LTS ammoniate impregnated in porous material at heat sink temperature, b-c shown in FIG. 1(1) which demonstrates isobaric cooling. Point c is the equilibrium state of LTS synthesis reaction.

In the second step, the energy storage system may be operated in a number of ways in order to reproduce electricity, heating or cooling (refrigeration).

To reproduce electric power generation and additional refrigeration, the LTS vessel is heated at 60° C. (as shown in FIG. 1(2a) by the path d). The LTS vessel releases high pressure ammonia which passes through the expander and produces electricity (as shown in FIG. 1(2a) by the path d). Afterwards, the exhausted ammonia is adsorbed by HTS vessel (FIG. 1(2a) by the path e-f).

The ammonia vapour arrives at the inlet of the expander at low temperature but at high pressure and simultaneously, the HTS adsorbent downstream of the expander is at an extremely low equilibrium pressure; good performance of the expansion and large power outputs are achieved. The exhausted ammonia provides additional refrigeration.

To produce heat, the LTS vessel is heated at 60° C. (FIG. 1(2b) shown by the path d-e) and the LTS vessel releases ammonia which is directly be adsorbed by the HTS vessel. A valve is provided connect the LTS vessel and the HTS vessel directly.

A high temperature synthesis heat (d-e) is produced as shown in FIG. 1(2b).

If high temperature sorbent material is $NiCl_2$, heat at around 260° C. is released. Other sorbent materials such as $MnCl_2$ produce heat at around 150° C. and $CaCl_2$ produces heat at around 90° C.

To produce refrigeration, the LTS vessel is configured to extract heat from the surroundings and thereby the LTS vessel produces a cooling effect on the surroundings. The extracted heat initiates a release of the ammonia (as shown in FIG. 1(2c) path d-e) and the decomposition heat extracted from the surroundings results in a refrigeration effect. Simultaneously, the HTS vessel is cooled and adsorbs the ammonia (as shown in FIG. 1(2c) path d-e).

The HTS adsorbent cooling temperatures that result in a refrigeration effect are dependent on the selected sorbent material. $CaCl_2$ can be cooled at 20° C. for −15° C. refrigeration effect, whereas $MnCl_2$ and $NiCl_2$ only need to be cooled at maximum 71° C. and 157° C., respectively for the same refrigeration effect. Therefore, choosing $MnCl_2$ and $NiCl_2$ as HTSs yields much better and lower-temperature refrigeration if a 20° C. heat sink is applied.

By using chemical reactions (i.e. the formation of or breaking of chemical bonds, e.g. dative bonds), for example between refrigerant gases (such as steam or ammonia) and solid sorbents (such as MgO and halide salts), heat may be stored long term (with minimal losses) at one temperature and then extracted from the storage system as either: heat (at the same or a higher temperature), cooling or electricity. Energy extracted from the storage system can then be used to reduce the electricity, heating and/or cooling demand leading to financial benefits.

There are two components of a thermochemical heat storage system:

1. A chemical reactor containing the sorbent material (solid or liquid) that can be heated or cooled. When it is heated (heat being supplied to the reactor, from either waste heat or the environment and converted to chemical potential energy) a refrigerant gas is desorbed and leaves the reactor. When the refrigerant enters the reactor and is absorbed, heat is generated and this is extracted from the reactor as heat and used in for example an industrial process.

2. A compressor/expander that either consumes work (electricity) in order to compress the refrigerant gas, or expands the gas to produce work that can generate electricity.

An optional third component would be a condenser/evaporator that either condenses refrigerant leaving a reactor, producing a useful heat output, or evaporates the refrigerant with a heat input that can either be from the environment or 'waste' heat from an industrial process.

A key novel aspect of this storage technology is that the components are inter-changeable so that a bespoke system can be developed for an industrial plant or process depending upon the amount or frequency of recoverable heat produced, the demands for heating, cooling and electricity and the operational needs of the system. This flexibility improves efficiency, maximises energy demand reduction and allows the system to be utilised for a wide range of applications. A competing approach to improve industrial energy utilisation is a system with thermal energy storage using high temperature phase change materials and a suitable operating temperature Organic Rankine Cycle engine to reduce electricity demand within an industrial application.

Cooling and electric power chemisorption systems employ compressors/expanders and the performance characteristics of ammonia-solid chemisorption such as heat and mass transfer, adsorption/desorption capacity, reactive materials and chemical reaction kinetics can be good.

There are many types of reactors and heat exchangers able to be incorporated into the device and method (i.e. regenerators) such as cylindrical regenerators, shell and finned-tube regenerators, rotating multiple bed regenerators, plate heat exchanger regenerators.

Alternative compressor/expander technologies are available and suitable for the device. Examples include rotatory devices such as scroll type, vane type, or lobe type devices, and examples of reciprocating devices include in-line type, "V"-shape type, tandem piston type, single-acting type, and double-acting type.

Many materials have been studied as the porous support of the consolidated adsorbent compound, such as activated carbon, vermiculite, expanded graphite, zeolite, and silica gel. Certain porous supports have physical-sorption capability toward the refrigerant gas which contributes an extra sorption bonus. Others are just inert matrices.

For example, expandable graphite is used to produce a porous supporter. The expandable graphite is expanded by heat treatment at approximately 600° C. for a duration of approximately 10 min by position the expandable graphite in an electric oven. The exact temperature and duration of heating with depend on different raw graphite materials. The expanded graphite is then mixed with a salt solution such as a halide salt, for example $CaCl_2$ and dried for approximately 24 hours at 110° C. to remove the free water and allow the impregnation of the $CaCl_2.nH_2O$ in to the expanded graphite material. The mixture is kept for several hours at a temperature of around 270° C. to calcinate the $CaCl_2.nH_2O$ into $CaCl_2$. The optimal mass ratio of salt to expanded graphite has been studied for improved heat and mass transfer. The optimal mass fraction of reactive salt over the total adsorbent compound ranges from 50% to 90%, e.g. from 65% to 80%.

The compound adsorbent of $CaCl_2$ and expanded graphite improves the thermal conductivity of pure salt ($CaCl_2$) by about 36 times. The addition of expanded graphite texture contributes to the mass transfer of the refrigerant gas and reduces swelling and agglomeration that the pure salt adsorbent has been found to be susceptible to.

The reaction equilibrium and dynamic behaviour for salt/refrigerant combinations has been studied for a number of salt/refrigerant combinations.

High temperature phase change material stores may be used and may be tailored to specific industrial temperature ranges Many materials have been studied as the porous material or support for consolidated adsorbent compound, such as activated carbon, vermiculite, expanded graphite, zeolite, and silica gel. Some of the materials have physical-sorption capability toward the refrigerant, which provides an extra sorption bonus, and some are just inert matrices that provide a support for the adsorbent compound. The addition of these porous supporters enhances the heat and mass transfer properties of adsorbent materials, leading to overall performance improvement of the device.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A chemisorption based energy storage device comprising:
    a first chemical reactor containing a first sorbent material and a second chemical reactor containing a second sorbent material different from the first sorbent material, the first sorbent material having an affinity towards a refrigerant gas at a high temperature and the second sorbent material having an affinity towards the refrigerant gas at a low temperature, the first and second chemical reactors being further provided with means for putting heat in to, or taking heat out of, the first and/or the second sorbent materials;
    a compressor/expander module selectively connected to the first and second chemical reactors, the compressor/expander module being configured to either compress or expand the refrigerant;
    wherein the means for putting heat in to, or taking heat out of, the first and/or the second sorbent materials provides a flow of refrigerant between the compressor/expander module and the first and second chemical reactors, and wherein the compressor/expander module is operable to compress or expand the refrigerant depending on energy storage requirements.

2. The device according to claim 1, wherein the refrigerant is ammonia.

3. The device according to claim 1, wherein the refrigerant is methanol.

4. The device according to claim 1, wherein the refrigerant is steam.

5. The device according to claim 1, wherein the first sorbent material is a salt selected from a metal halide, a metal sulphide and a metal sulphate.

6. The device according to claim 5, wherein the first sorbent material is a salt selected from the group: $NiCl_2$, $CaCl_2$, $MgCl_2$, $MgSO_4$ and $MnCl_2$.

7. The device according to claim 1, wherein the second sorbent material is a salt selected from a metal halide, a metal sulphide and a metal sulphate.

8. The device according to claim 7, wherein the salt is selected from the group: $CaCl_2$, $SrCl_2$, $BaCl_2$ and NaBr.

9. The device according to claim 1, wherein the first sorbent material and/or the second sorbent material is porous.

10. The device according to claim 1, wherein a valve is provided to provide selective connection to the compressor/expander module.

11. A method of operating a chemisorption based energy storage device to store energy, the device comprising:
    a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
heating the first chemical reactor to release refrigerant gas from the first sorbent material;
compressing the refrigerant gas released from the first chemical reactor; and
entraining compressed refrigerant gas to the second chemical reactor, the compressed refrigerant gas adsorbing onto the second sorbent material.

12. A method of operating a chemisorption based energy storage device to store energy, the device comprising:
a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
heating the first chemical reactor to release refrigerant gas from the first sorbent material;
expanding the refrigerant gas released from the first chemical reactor; and
entraining refrigerant gas to the second chemical reactor, the refrigerant gas adsorbing onto the second sorbent material.

13. A method of operating a chemisorption based energy storage device to store energy and generate electric power and refrigeration, the device comprising:
a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
heating the second chemical reactor to release a high pressure refrigerant gas;
entraining the high pressure refrigerant gas to the compressor/expander module;
expanding the high pressure refrigerant gas to produce electricity and an exhausted refrigerant gas; and
entraining the exhausted refrigerant gas to the first chemical reactor for adsorption onto the first sorbent material.

14. A method of operating a chemisorption based energy storage device to store energy and generate heat, the device comprising:
a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
heating the second chemical reactor to release a high pressure refrigerant gas; and
entraining the high pressure refrigerant gas directly to the first chemical reactor causing the high pressure refrigerant gas to adsorb onto the first sorbent material to provide heat.

15. A method of operating a chemisorption based energy storage device to store energy and generate refrigeration, the device comprising:
a first chemical reactor containing a first sorbent material and a second chemical reactor containing a second sorbent material, the first sorbent material having an affinity towards a refrigerant gas at high temperature and the second sorbent material having an affinity towards the refrigerant gas at low temperature, the first and second chemical reactors being further provided with means for putting heat in to, or taking heat out of, the first and second chemical reactors and a compressor/expander module selectively connected to the first and second chemical reactors, the compressor/expander module being configured to either compress or expand the refrigerant, the method comprising:
extracting heat from an external source and directing that heat to the second chemical reactor causing release of refrigerant gas from the second sorbent material; and
entraining the refrigerant gas directly to the first chemical reactor wherein the refrigerant gas is adsorbed onto the first sorbent material.

* * * * *